United States Patent
Nishisaka et al.

(10) Patent No.: US 11,626,252 B2
(45) Date of Patent: Apr. 11, 2023

(54) ELECTRONIC COMPONENT AND METHOD OF MANUFACTURING THE ELECTRONIC COMPONENT

(71) Applicant: Murata Manufacturing Co., Ltd., Nagaokakyo (JP)

(72) Inventors: Yasuhiro Nishisaka, Nagaokakyo (JP); Mitsuru Ikeda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 11 days.

(21) Appl. No.: 17/366,136

(22) Filed: Jul. 2, 2021

(65) Prior Publication Data

US 2022/0013293 A1    Jan. 13, 2022

(30) Foreign Application Priority Data

Jul. 7, 2020   (JP) .............................. JP2020-116885

(51) Int. Cl.
| | |
|---|---|
| *H01G 4/30* | (2006.01) |
| *H01G 4/012* | (2006.01) |
| *H01G 4/12* | (2006.01) |
| *C04B 35/01* | (2006.01) |
| *H01G 4/008* | (2006.01) |

(52) U.S. Cl.
CPC .............. *H01G 4/30* (2013.01); *C04B 35/01* (2013.01); *H01G 4/008* (2013.01); *H01G 4/012* (2013.01); *H01G 4/1209* (2013.01); *C04B 2235/656* (2013.01)

(58) Field of Classification Search
CPC .......... H01G 4/30; H01G 4/008; H01G 4/012; H01G 4/1209; H01G 4/1227; H01G 4/2325; H01G 4/228; H01G 4/306; H01G 2/02; H01G 4/1218; H01G 4/32; C04B 35/01; C04B 2235/656
See application file for complete search history.

(56) References Cited

U.S. PATENT DOCUMENTS

| | | | | |
|---|---|---|---|---|
| 2009/0323253 | A1* | 12/2009 | Kobayashi | H01G 4/005 |
| | | | | 427/79 |
| 2016/0268046 | A1* | 9/2016 | Nishisaka | H01G 4/232 |
| 2018/0182552 | A1* | 6/2018 | Sawada | H01G 4/232 |
| 2020/0043657 | A1 | 2/2020 | Arizumi et al. | |

(Continued)

FOREIGN PATENT DOCUMENTS

JP     2020-021819 A     2/2020

*Primary Examiner* — Michael P McFadden
(74) *Attorney, Agent, or Firm* — Keating & Bennett, LLP

(57) ABSTRACT

An electronic component includes a multilayer body including a multilayer main body including end surfaces at which internal nickel electrode layers are exposed, side gap portions, external nickel layers on the end surfaces of the multilayer body, and external copper electrode layers covering the end surfaces on which the external nickel layers are provided. A nickel-based oxide and/or a silicon-based oxide are provided between the external nickel layer and the external copper electrode layer. A nickel layer and a tin layer are provided outside the external copper electrode layer. In a cross section passing through a middle of the electronic component in the width direction and extending in the length direction and the lamination direction, a relationship of about $0.2 \leq Tea/Tem \leq$ about $1.1$ is satisfied.

8 Claims, 13 Drawing Sheets

(56) References Cited

U.S. PATENT DOCUMENTS

| | | | |
|---|---|---|---|
| 2020/0051745 A1* | 2/2020 | Park | H01G 4/1227 |
| 2021/0065982 A1* | 3/2021 | Jung | H01G 4/2325 |
| 2021/0125780 A1* | 4/2021 | Hayashi | H01G 13/006 |
| 2021/0183576 A1* | 6/2021 | Song | H01G 4/224 |

* cited by examiner

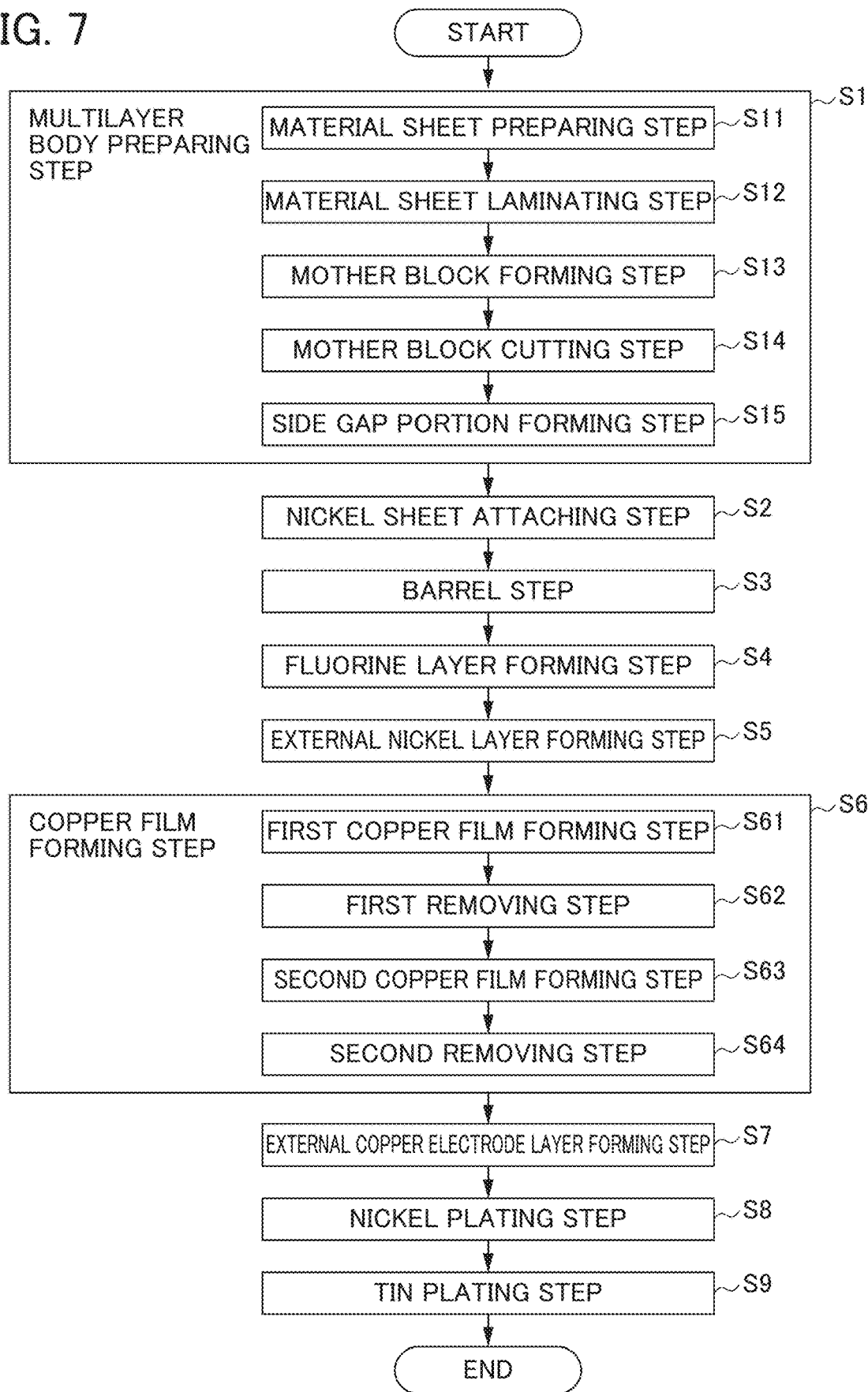

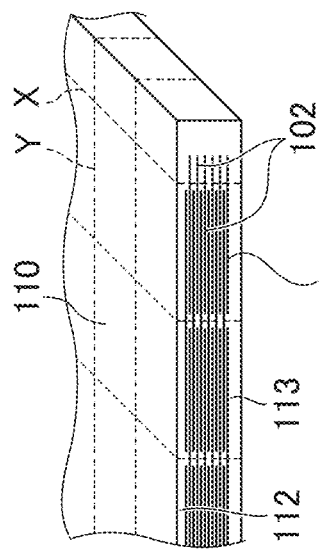
FIG. 8A
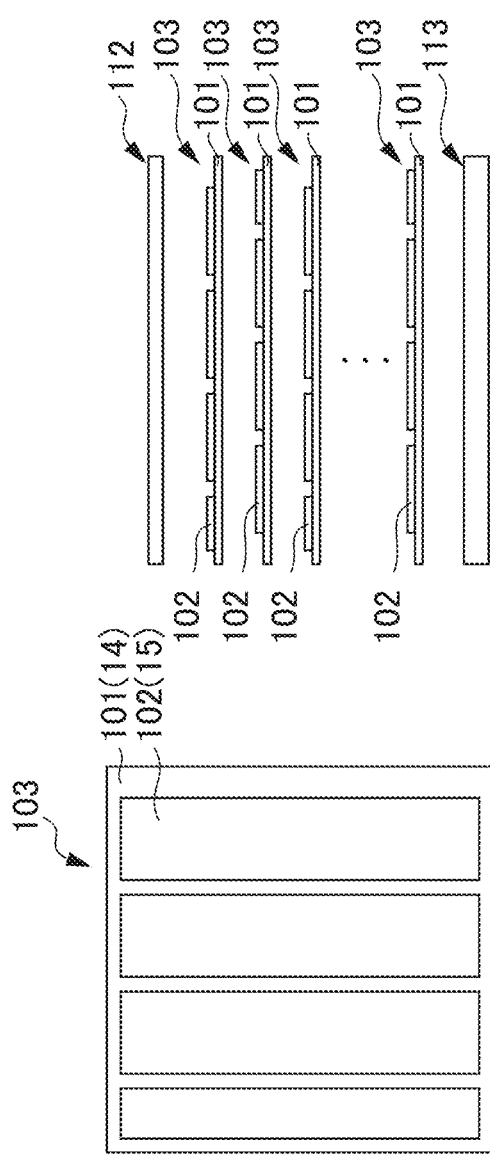
FIG. 8B
FIG. 8C
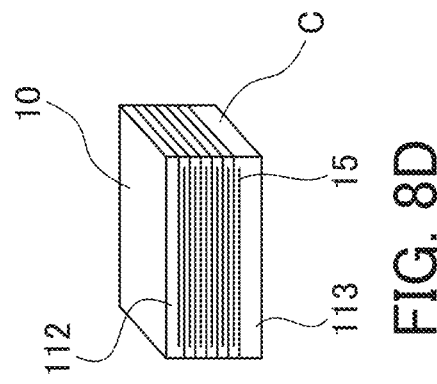
FIG. 8D
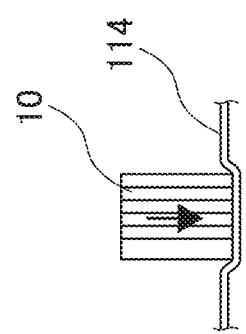
FIG. 8E
FIG. 8F

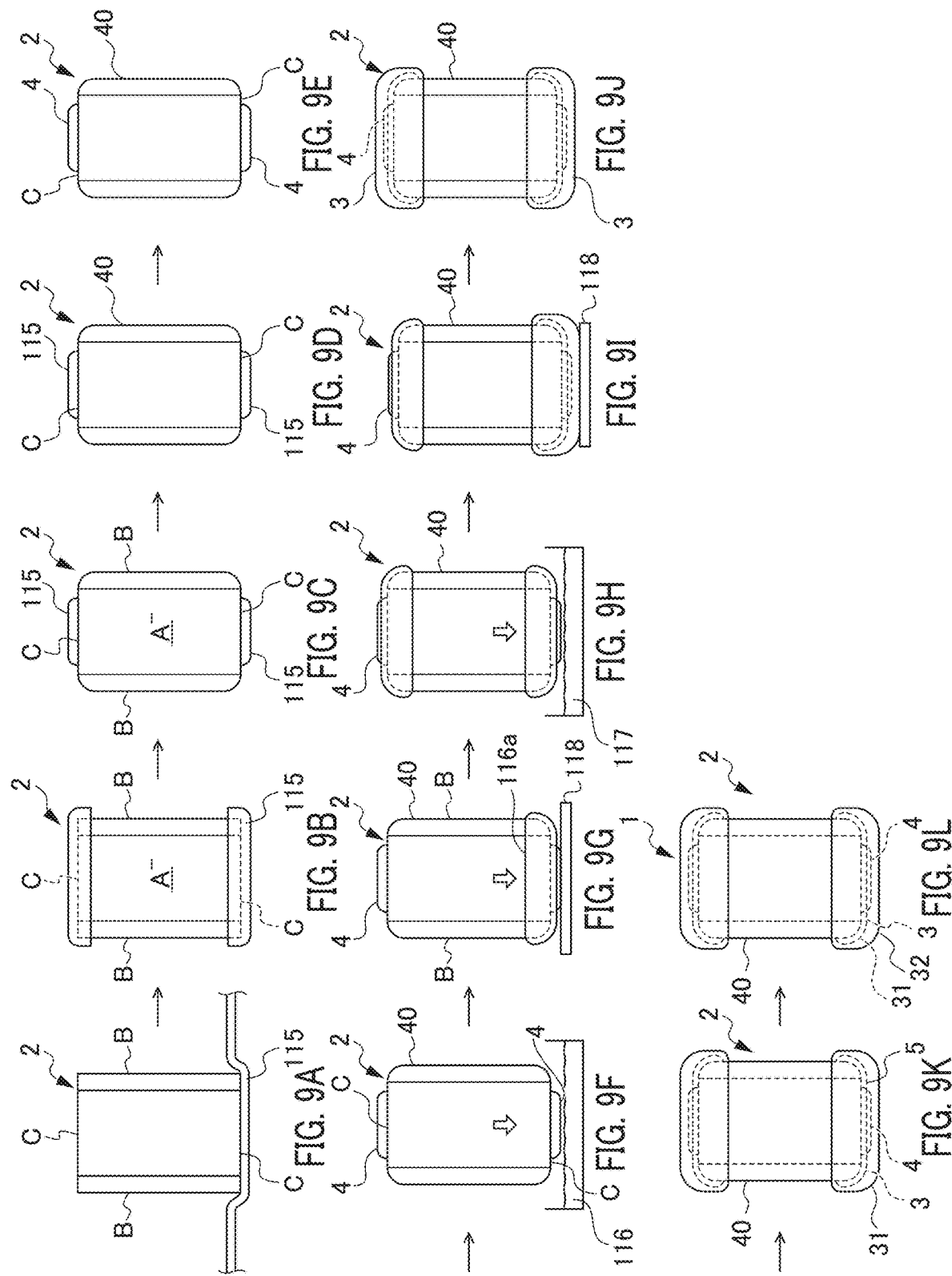

ELECTRONIC COMPONENT AND METHOD OF MANUFACTURING THE ELECTRONIC COMPONENT

CROSS REFERENCE TO RELATED APPLICATIONS

This application is based on and claims the benefit of priority from Japanese Patent Application No. 2020-116885, filed on Jul. 7, 2020, the entire contents of which are incorporated herein by reference.

BACKGROUND OF THE INVENTION

1. Field of the Invention

The present invention relates to an electronic component and a method of manufacturing an electronic component.

2. Description of the Related Art

Recently, with the miniaturization and increased capacitance of electronic components such as multilayer ceramic capacitors, the number of the internal electrode layers is increasing, and the side gap portions have been minimized. In such a small multilayer ceramic capacitor, copper used for the external electrode layers is diffused into the interior of nickel which is used for the internal electrode layers, such that the thickness of each of the internal electrode layers increases, and cracks may occur. On the other hand, when using nickel for the external electrode layer, it is not possible to ensure moisture resistance sufficiently with only the external electrode layers, and there may be a case in which water enters the internal electrode layers beyond the external electrode layers. Therefore, a method is used which forms nickel layers on end surfaces where the internal electrode layers are exposed, and applies copper for external electrode layers so as to cover the end surfaces where the nickel layers are formed (refer to Japanese Unexamined Patent Application Publication No. 2020-21819).

However, due to the shrinkage stress of the nickel layers, there is a possibility that cracks occur in the multilayer ceramic capacitor.

SUMMARY OF THE INVENTION

Preferred embodiments of the present invention provide electronic components and methods of manufacturing electronic components which are resistant to cracking and can be miniaturized.

An electronic component according to a preferred embodiment according to the present invention includes a multilayer body including a multilayer main body and side gap portions, the multilayer main body including an inner layer portion that includes dielectric layers and internal nickel electrode layers laminated alternately therein, and including end surfaces on both sides in a length direction intersecting a lamination direction, wherein the internal nickel electrode layers are exposed at the end surfaces, the side gap portions being provided on both sides of the multilayer main body in a width direction intersecting the lamination direction and the length direction; external nickel layers provided on the end surfaces of the multilayer body; and external copper electrode layers covering the end surfaces on which the external nickel layers are provided, a nickel-based oxide and/or a silicon-based oxide are provided between the external nickel layer and the external copper electrode layer, a nickel layer and tin layer are provided outside the external copper electrode layer, and in a cross-section passing through a middle of the electronic component in the width direction and extending in the length direction and the lamination direction, when the external nickel layer is divided into four equal or substantially equal portions in the lamination direction by three linear lines extending in the length direction, an average value of a thickness of the external nickel layer on a center linear line among the three linear lines is defined as Tem, and an average value of a thickness of the external nickel layer on all of the three linear lines is defined as Tea, about $0.2 \leq \text{Tea}/\text{Tem} \leq \text{about } 1.1$ is satisfied.

According to preferred embodiments of the present invention, it is possible to provide electronic components and methods of manufacturing electronic components which are resistant to cracking and can be miniaturized.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a flowchart for explaining a method of manufacturing the multilayer ceramic capacitor of the first preferred embodiment of the present invention.

FIGS. 8A to 8F are diagrams for explaining a multilayer body preparing step S1 in the method of manufacturing the multilayer ceramic capacitor of the first preferred embodiment of the present invention.

FIGS. 9A to 9L are diagrams for explaining steps after a nickel sheet attaching step S2 in the method of manufacturing the multilayer ceramic capacitor of the first preferred embodiment of the present invention.

DETAILED DESCRIPTION OF THE PREFERRED EMBODIMENTS

First Preferred Embodiment

Figure 1:
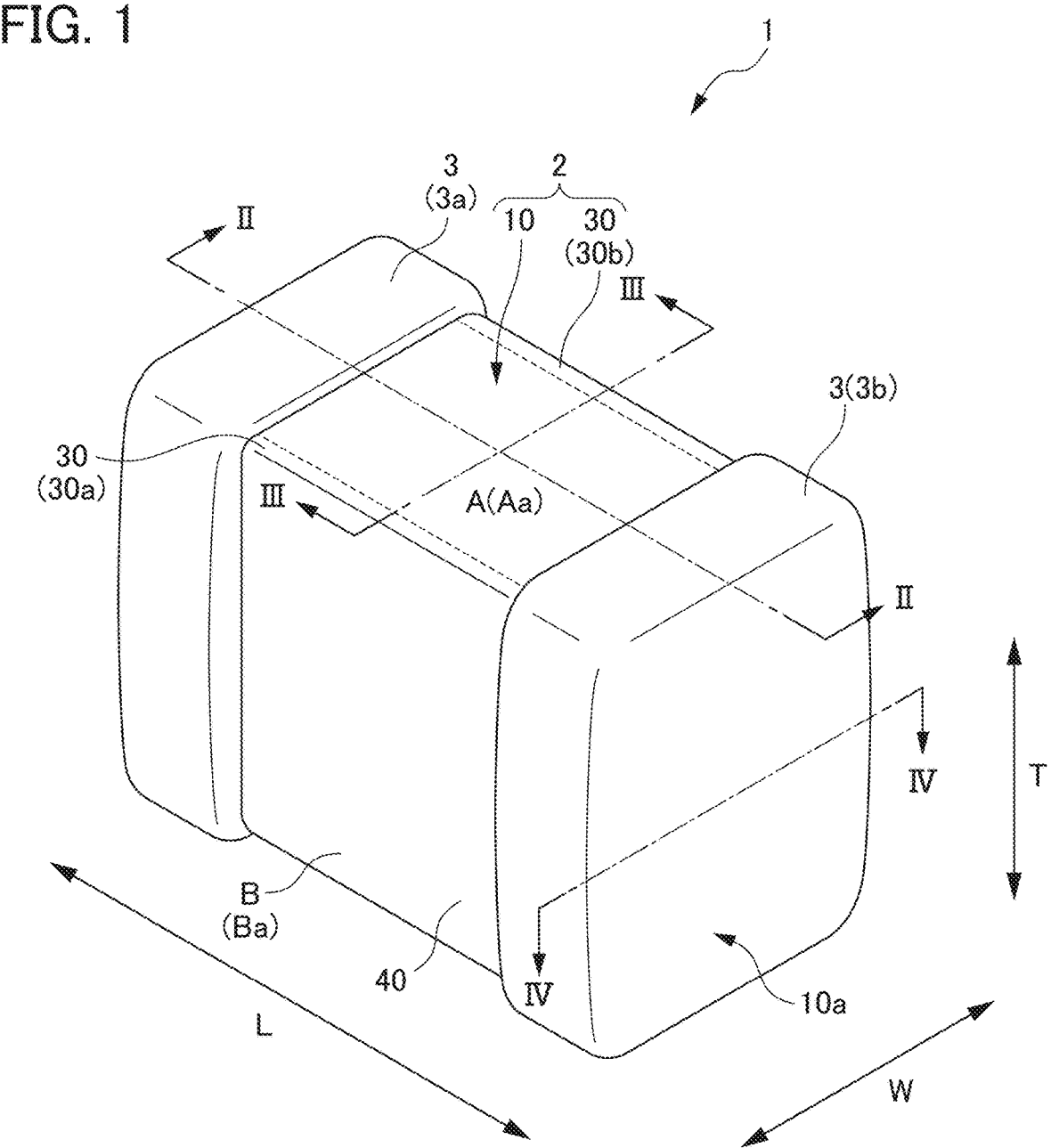
FIG. 1 is a schematic perspective view of a multilayer ceramic capacitor according to a first preferred embodiment of the present invention.
Figure 2:
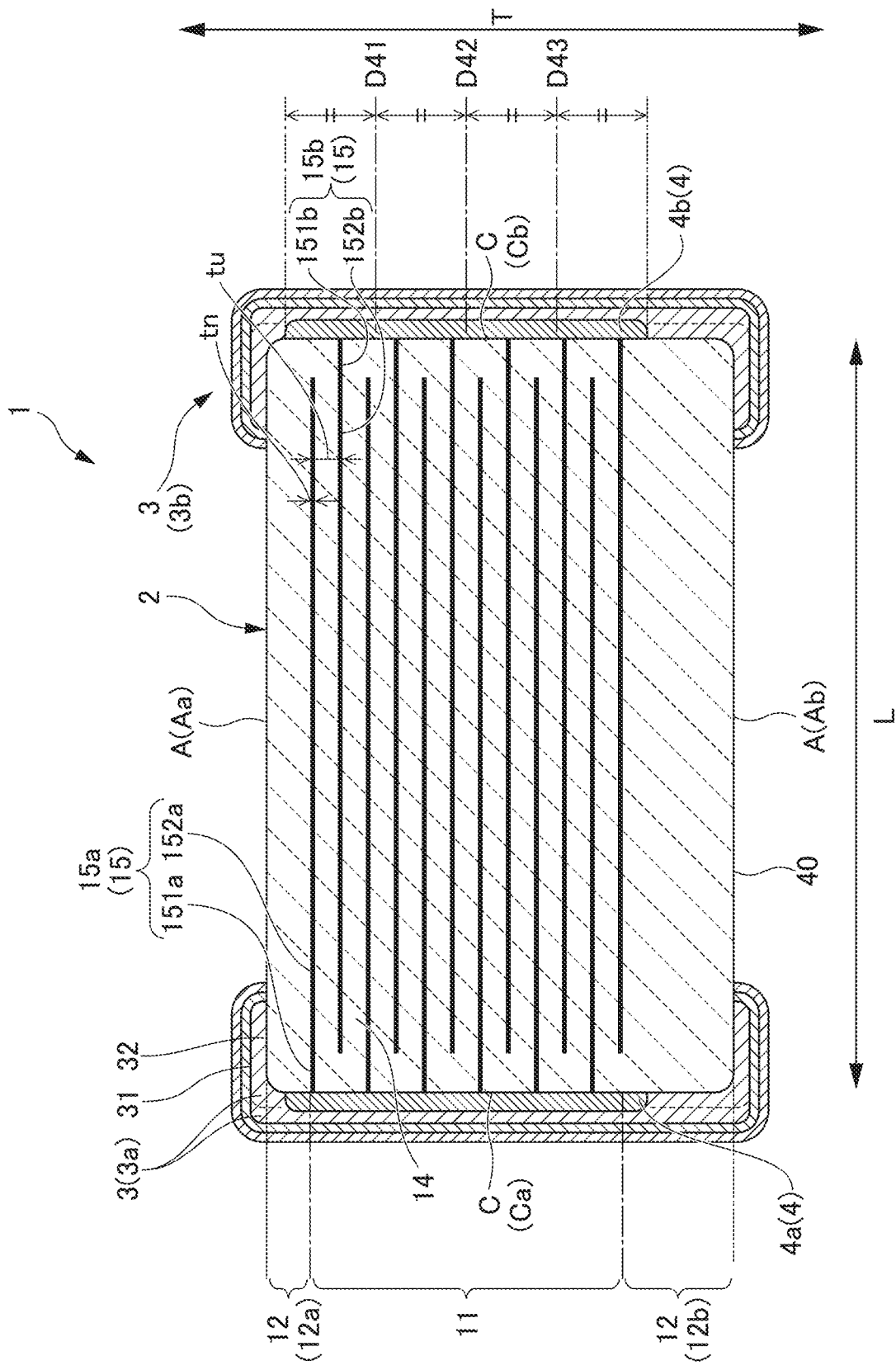
FIG. 2 is a cross-sectional view taken along the line II-II in FIG. 1 of the multilayer ceramic capacitor of the first preferred embodiment of the present invention.
Figure 3A:
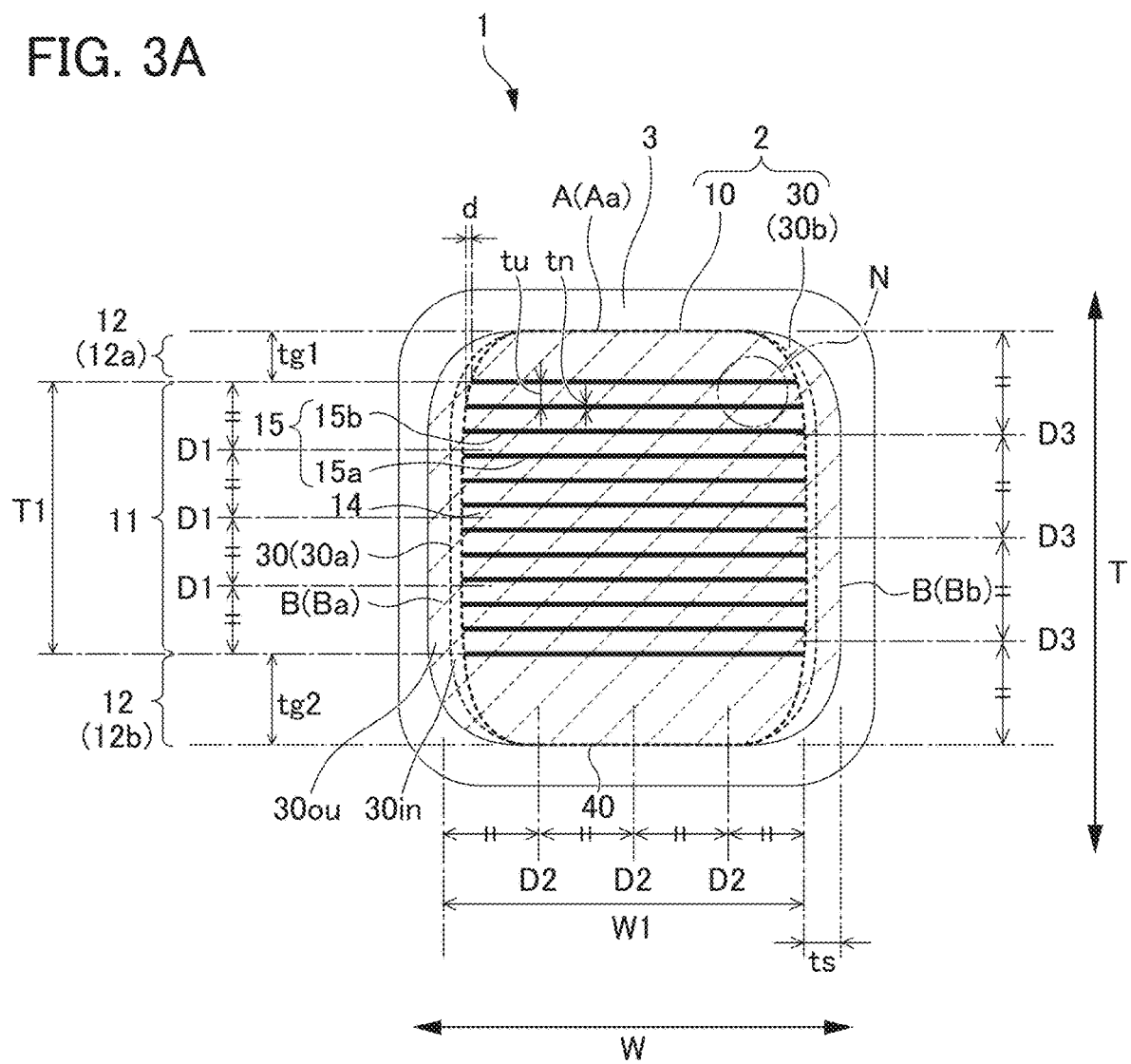
FIG. 3A is a cross-sectional view taken along the line in FIG. 1 of the multilayer ceramic capacitor 1 of the first preferred embodiment of the present invention.
Figure 3B:
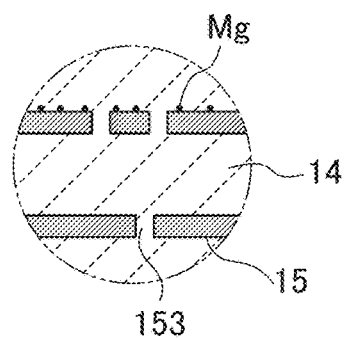
FIG. 3B is a partially enlarged view of FIG. 3A.
Figure 4A:
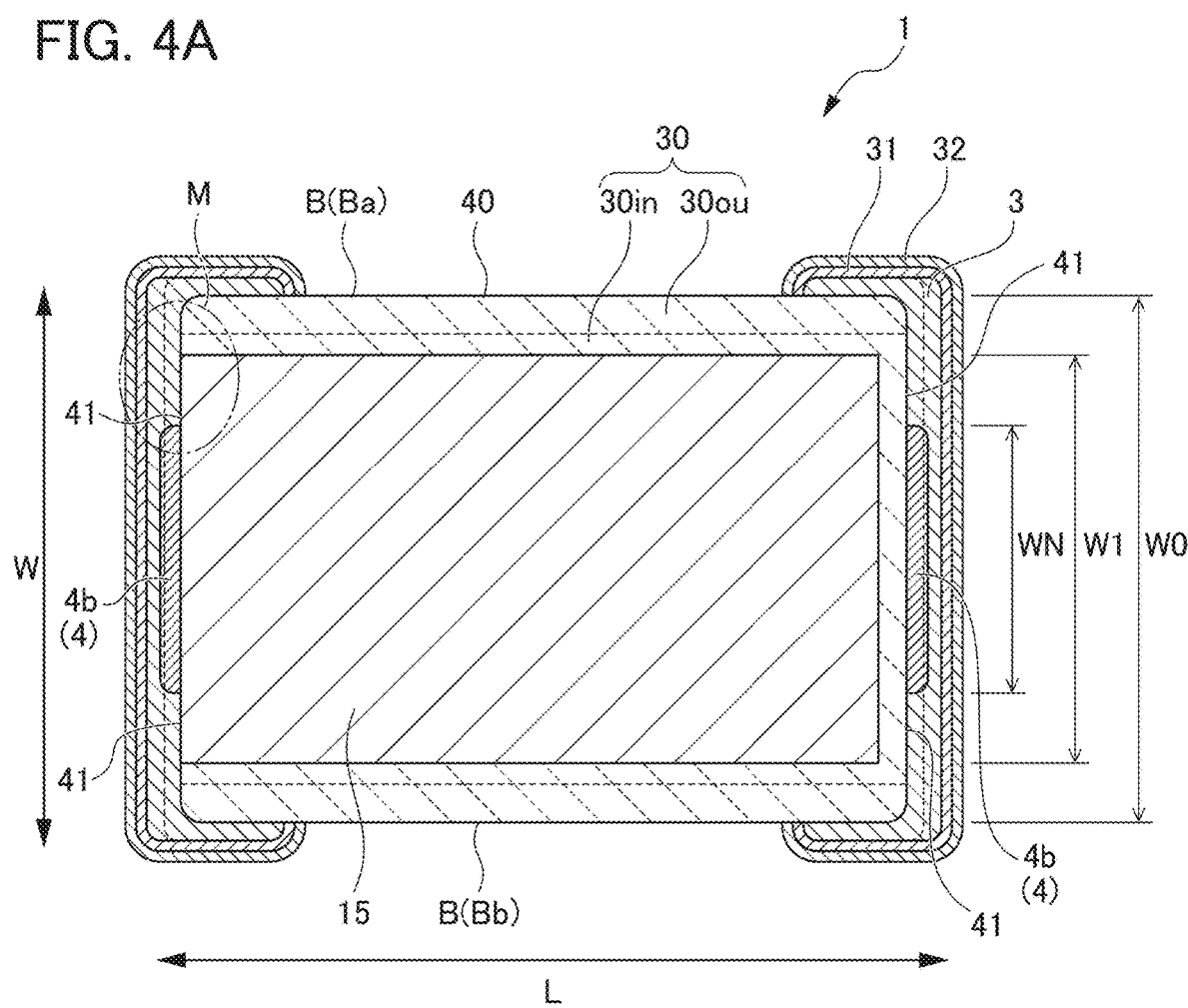
FIG. 4A is a cross-sectional view taken along the line IV-IV in FIG. 1 of the multilayer ceramic capacitor of the first preferred embodiment of the present invention.
Figure 4B:
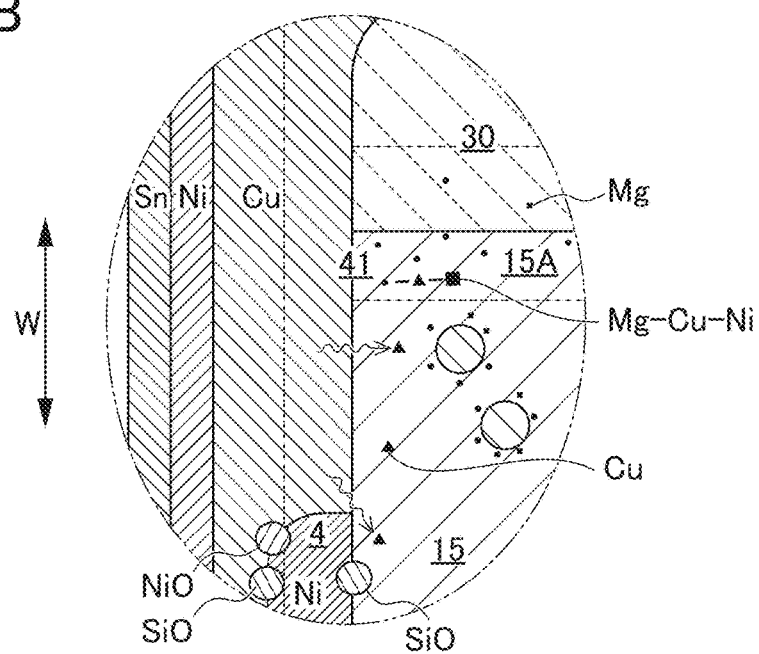
FIG. 4B is a partially enlarged view of FIG. 4A.

First, a description will be provided of a multilayer ceramic capacitor 1 as an electronic component according to a first preferred embodiment of the present invention. FIG. 1 is a schematic perspective view of the multilayer ceramic capacitor 1 of the first preferred embodiment. FIG. 2 is a cross-sectional view taken along the line II-II in FIG. 1 of the multilayer ceramic capacitor 1 of the first preferred embodiment. FIG. 3A is a cross-sectional view taken along the line III-III line in FIG. 1 of the multilayer ceramic capacitor 1 of the first preferred embodiment, and FIG. 3B is a partially enlarged view of the N portion in FIG. 3A. FIG. 4A is a cross-sectional view taken along the line IV-IV in FIG. 1 of the multilayer ceramic capacitor of the first preferred embodiment, and FIG. 4B is a partially enlarged view of the M portion of FIG. 4A.

The multilayer ceramic capacitor 1 has a rectangular or substantially rectangular parallelepiped shape, and includes a multilayer body 2, a pair of external nickel layers 4 provided at both ends of the multilayer body 2 (shown in FIGS. 2 and 4), and external copper electrode layers 3 provided on the outside of the external nickel layers 4 at both ends of the multilayer body 2. Furthermore, the multilayer body 2 includes an inner layer portion 11 including a plurality of sets of the dielectric layers 14 and the internal nickel electrode layers 15.

In the following description, as a term representing the orientation of the multilayer ceramic capacitor 1, the length direction L indicates the direction in which the pair of external copper electrode layers 3 are provided in the multilayer ceramic capacitor 1. The lamination (stacking) direction T indicates the direction in which the dielectric layers 14 and the internal nickel electrode layers 15 are laminated (stacked). The width direction W indicates a direction intersecting both the length direction L and the lamination direction T. It should be noted that, in the present preferred embodiment, the width direction W is orthogonal or substantially orthogonal to both the length direction L and the lamination direction T.

Figure 5:
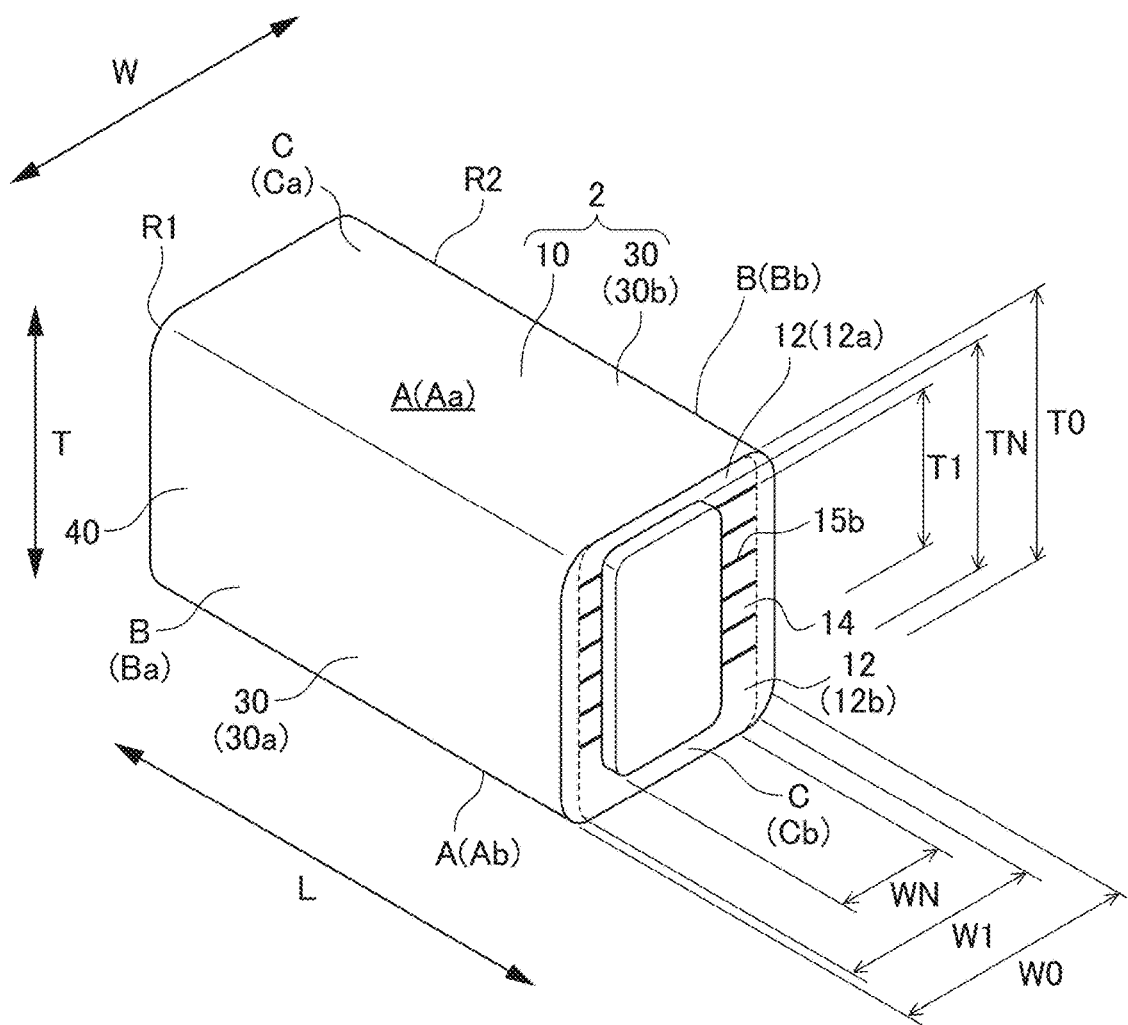
FIG. 5 is a schematic perspective view of a multilayer body of the multilayer ceramic capacitor of the first preferred embodiment of the present invention.
Figure 6:
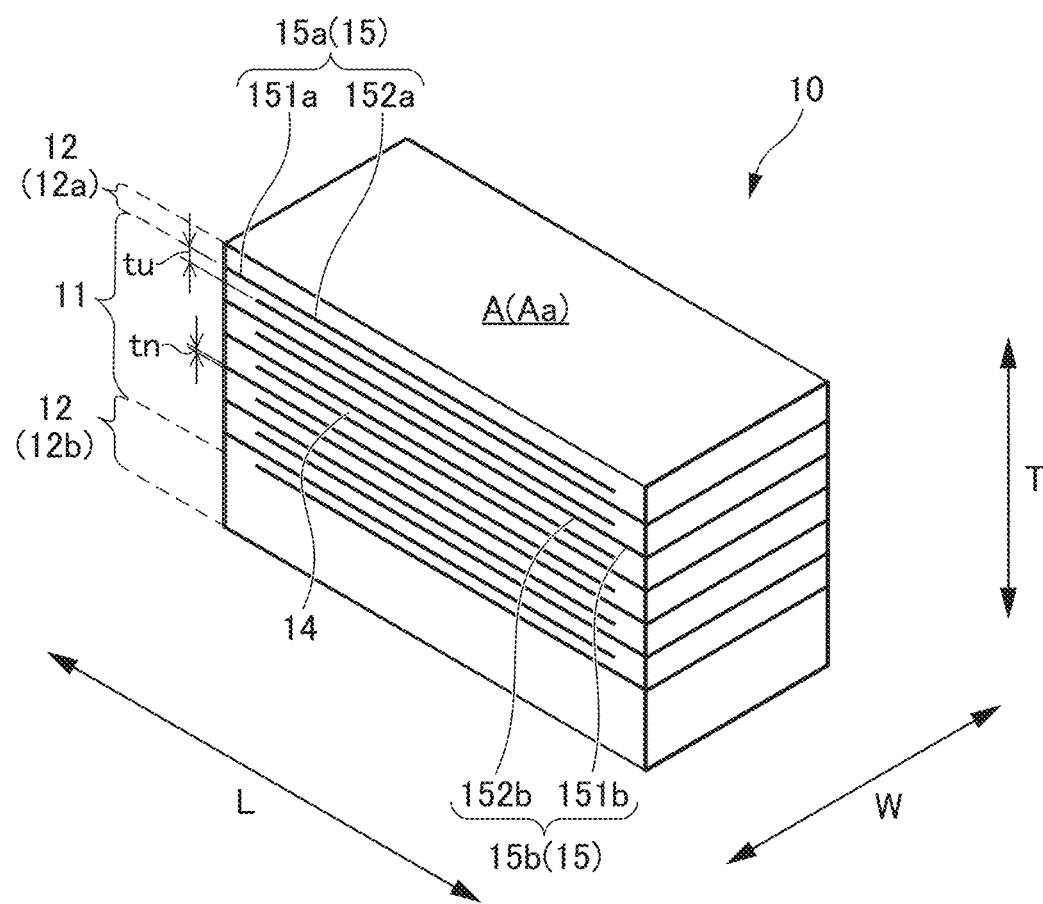
FIG. 6 is a schematic perspective view of a multilayer main body of the multilayer ceramic capacitor of the first preferred embodiment of the present invention.

FIG. 5 is a schematic perspective view of the multilayer body 2 including the external nickel layers 4. The multilayer body 2 includes the multilayer main body 10 and side gap portions 30. FIG. 6 is a schematic perspective view of the multilayer main body 10 in a state before the external nickel layers 4 and the side gap portions 30 are provided.

In the following description, among the six outer surfaces of the multilayer body 2 shown in FIG. 5, a pair of outer surfaces opposed in the lamination direction T are defined as a first main surface Aa and a second main surface Ab, a pair of outer surfaces opposed in the width direction W are defined as a first side surface Ba and a second side surface Bb, and a pair of outer surfaces opposed in the length direction L are defined as a first end surface Ca and a second end surface Cb. It should be noted that, when it is not necessary to particularly distinguish the first main surface Aa and the second main surface Ab from each other, they are collectively described as the main surface A; when it is not necessary to particularly distinguish the first side surface Ba and the second side surface Bb from each other, they are collectively described as the side surface B; and when it is not necessary to particularly distinguish the first end surface Ca and the second end surface Cb from each other, they are collectively described as the end surface C.

Multilayer Body 2

The multilayer body 2 includes a rounded corner portion R1 and a rounded ridge portion R2. The corner portion R1 is a portion where the main surface A, the side surface B, and the end surface C intersect. The ridge portion R2 is a portion where two surfaces of the multilayer body 2, i.e., the main surface A and the side surface B, the main surface A and the end surface C, or the side surface B and the end surface C, intersect. The amounts of rounding of the corner portion R1 and the ridge portion R2 are R=about 8 μm to about 150 μm, and preferably R=about 8 μm to about 20 μm, for example. In addition, surface irregularities and the like may be provided on a portion or all of the main surface A, the side surface B, and the end surface C of the multilayer body 2.

In the present preferred embodiment, as shown in FIG. 5, when the dimension in the width direction W of the multilayer body 2 is defined as W0, and the dimension in the lamination direction T is defined as T0, it is preferable for W0<T0, that is, to be a vertically long shape. However, the present invention is not limited thereto, and may be W0≥T0. The respective dimensions are not particularly limited. However, for example, the dimension L0 in the length direction L is preferably about 0.2 mm L0 about 10 mm (about 0.2 mm or more and about 10 mm or less), the dimension W0 in the width direction W dimension is preferably about 0.1 mm≤W0≤about 5 mm (about 0.1 mm or more and about 5 mm or less), and the dimension T0 in the lamination direction T is preferably about 0.1 mm≤T0≤about 5 mm (about 0.1 mm or more and about 5 mm or less).

Multilayer Main Body 10

As shown in FIGS. 2, 3 and 6, the multilayer main body includes the inner layer portion 11, an upper outer layer portion 12a provided close to the first main surface Aa of the inner layer portion 11, and a lower outer layer portion 12b provided close to the second main surface Ab of the inner layer portion 11. It should be noted that, when it is not necessary to particularly distinguish between the upper outer layer portion 12a and the lower outer layer portion 12b, they are collectively described as the outer layer portion 12.

Inner Layer Portion 11

The inner layer portion 11 (effective region) includes a plurality of sets of the dielectric layers 14 and the internal nickel electrode layers 15 laminated alternately along the lamination direction T. In the present preferred embodiment, as shown in FIG. 5, when the dimension in the width direction W of the inner layer portion 11 is defined as W1, and the dimension in the lamination direction T of the inner layer portion 11 is defined as T1, it is preferable for T1<W1, that is, to be a horizontally long shape. This is because a horizontally long shape makes it possible to easily increase the capacitance of the multilayer ceramic capacitor 1. However, the present invention is not limited thereto, and may be T1≥W1.

Dielectric Layer 14

The dielectric layers 14 are each made of, for example, a ceramic material including barium, titanium and dysprosium. The thickness tu of the dielectric layer 14 is preferably, for example, about 0.40 μm≤tu≤about 0.50 μm (about 0.40 μm or more and about 0.50 μm or less).

It should be noted that the number of dielectric layers 14 included in the multilayer main body 10 including the upper outer layer portion 12a and the lower outer layer portion 12b is preferably fifteen sheets or more and 700 sheets or less, for example.

Internal Nickel Electrode Layer 15

The internal nickel electrode layers 15 include a plurality of first internal nickel electrode layers 15a, and a plurality of second internal nickel electrode layers 15b. The first internal nickel electrode layers 15a and the second internal nickel electrode layers 15b are provided alternately. When it is not necessary to distinguish the first internal nickel electrode layer 15a from the second internal nickel electrode layer 15b, they are collectively described as the internal nickel electrode layer 15.

The thickness tn of the internal nickel electrode layer 15 is preferably about 0.25 µm≤tn≤about 0.33 µm (about 0.25 µm or more and about 0.33 µm or less), for example.

The number of the internal nickel electrode layers 15 is preferably, for example, fifteen sheets or more and 700 sheets or less in total of the first internal nickel electrode layers 15a and the second internal nickel electrode layers 15b.

The first internal nickel electrode layer 15a includes a first opposing portion 152a provided opposite to the second internal nickel electrode layer 15b, and a first lead-out portion 151a extending from the first opposing portion 152a to the side of the first end surface Ca. An end of the first lead-out portion 151a is exposed at the first end surface Ca, and is electrically connected to a first external copper electrode layer 3a described later. The second internal nickel electrode layer 15b includes a second opposing portion 152b provided opposite to the first internal nickel electrode layer 15a, and a second lead-out portion 151b extending from the second opposing portion 152b to the second end surface Cb. An end of the second lead-out portion 151b is electrically connected to a second external copper electrode layer 3b described later. Charge is accumulated in the first opposing portion 152a of the first internal nickel electrode layer 15a and the second opposing portion 152b of the second internal nickel electrode layer 15b, such that the characteristics of the capacitor are developed.

As shown in FIGS. 3A and 3B, in the cross section WT along the width direction W and the lamination direction T passing through the middle of the length direction L of the multilayer body 2, the deviation amount d in the width direction W between the positions of the ends of the first internal nickel electrode layer 15a and the second internal nickel electrode layer 15b vertically adjacent to each other in the lamination direction T is within about 0.5 µm, for example. That is, the ends in the width direction W of the first internal nickel electrode layer 15a and the second internal nickel electrode layer 15b vertically adjacent to each other in the lamination direction T is substantially at the same position in the width direction W, and the positions of the ends are aligned in the lamination direction T.

As shown in FIGS. 3A and 3B, the deviation amount d of the position is a value obtained by averaging the deviation amount d in the width direction W of the ends between the internal nickel electrode layers 15 which are adjacent to each other and closest to the three dividing lines D1 when the inner layer portion 11 (effective region) is divided into four equal portions in the lamination direction T in the cross section TW of the middle of the length direction L.

It should be noted that, as shown in FIG. 3B, when viewed microscopically, a plurality of holes penetrating the internal nickel electrode layers 15 in the thickness direction (lamination direction T) are provided. The holes each have the material of the dielectric layer 14 therein as a column member 153 in a columnar shape.

Outer Layer Portion 12

The outer layer portion 12 is made of, for example, a ceramic material including barium, titanium and dysprosium, and is the same material as the dielectric layer 14 of the inner layer portion 11.

The outer layer portion 12 includes the upper outer layer portion 12a provided on the upper side in the lamination direction T of the inner layer portion 11, and the lower outer layer portion 12b provided on the lower side in the lamination direction T of the inner layer portion 11. The lower side refers to a side to be mounted on the substrate. In the present preferred embodiment, the lower outer layer portion 12b has a thickness tg2 in the lamination direction T which is thicker than a thickness tg1 of the upper outer layer portion 12a in the lamination direction T. In other words, the inner layer portion 11 including the internal nickel electrode layers 15 is biased toward the first main surface Aa in the lamination direction T.

In the multilayer ceramic capacitor 1, electric power is supplied to the internal nickel electrode layer 15, and an electric field is applied to the dielectric layer 14, a result of which there is a possibility that stress and mechanical strain are generated in the dielectric layer 14, which cause vibration. However, when the lower outer layer portion 12b is thicker than the upper outer layer portion 12a in the lamination direction T, the vibration is hardly transmitted to a substrate on which the multilayer ceramic capacitor 1 is mounted, and thus, the occurrence of "acoustic noise" is reduced or prevented. From the viewpoint of reducing or preventing the occurrence of "acoustic noise", the thickness tg2 of the lower outer layer portion 12b is, for example, preferably three times or more, and more preferably four times or more, than the thickness tg1 of the upper outer layer portion 12a. However, the present invention is not limited thereto, and the thickness tg1 in the lamination direction T of the upper outer layer portion 12a may be equal to the thickness tg2 in the lamination direction T of the lower outer layer portion 12b.

The thickness tg1 of the upper outer layer portion 12a, or both the thickness tg1 of the upper outer layer portion 12a and the thickness tg2 of the lower outer layer portion 12b in the lamination direction T, in a case in which they are equal or substantially equal to each other, are preferably about 10 µm≤tg1≤about 20 µm (about 10 µm or more and about 20 µm or less), for example.

As shown in FIGS. 3A and 3B, the thickness of the outer layer portion 12 is an average value obtained by averaging the thicknesses of the outer layer portion 12 on three dividing lines D2 when dividing the multilayer body 2 into four equal portions in the width direction W in the cross section TW of the middle in the length direction L of the multilayer body 2.

Furthermore, the thickness tg1 in the lamination direction T of the upper outer layer portion 12a and the thickness tg2 in the lamination direction T of the lower outer layer portion 12b are thicker than a thickness is of the side gap portion 30. With such a thickness of the outer layer portion 12, even if cracks occur, the cracks will not extend to the internal nickel electrode layer, and the reliability can be ensured.

Side Gap Portion 30

The side gap portions 30 cover the ends in the width direction W of the internal nickel electrode layers 15 exposed on both side surfaces of the multilayer main body 10 along the ends thereof. The side gap portions 30 include a first side gap portion 30a provided on the first side surface Ba of the multilayer main body 10, and a second side gap portion 30b provided on the second side surface Bb of the multilayer main body 10. When it is not necessary to particularly distinguish the first side gap portion 30a and the second side gap portion 30b from each other, they are collectively described as the side gap portion 30.

Thickness of the Side Gap Portion 30

The thickness ts of the side gap portion 30 is preferably about 5 μm≤ts≤about 12 μm (about 5 μm or more and about 12 μm or less), for example.

As shown in FIGS. 3A and 3B, the thickness of the side gap portion 30 is an average value obtained by averaging the thickness of the side gap portion 30 on three dividing lines D3 when dividing the multilayer body 2 into four equal portions in the lamination direction T in the cross section TW of the central portion in the length direction L.

Material of the Side Gap Portion 30

The side gap portions 30 are each made of, for example, a ceramic material including barium, titanium, and dysprosium, and is the same material as the dielectric layer 14 of the inner layer portion 11, and the outer layer portion 12. Furthermore, the side gap portions 30 each include, for example, magnesium as a sintering aid. Furthermore, the side gap portions 30 each include, for example, silicon-based oxide (SiO) and phosphorus (P)-based oxide. As shown in FIGS. 3A and 3B, when the side gap portions 30 are observed in the cross section TW of the central portion in the length direction L, the region where SiO exists has a flat shape (needle shape). Similarly, the region where P exists has a flat shape (needle shape). Also, the region where SiO and P are mixed similarly has a flat shape (needle shape). It should be noted that, in the present specification, the flat shape means an elongated shape in which the aspect ratio of the longitudinal direction to the transversal direction of the region observed in the cross section TW of the central portion in the length direction L is about 4 or more, for example.

Magnesium Segregation in the Side Gap Portion 30

As shown in FIG. 4B, magnesium included as a sintering aid shown by black circles in the drawing migrates to the internal nickel electrode layer 15 during sintering of the side gap portion 30, resulting in a segregation layer 15A being formed in the internal nickel electrode layer 15. The length of the segregation layer 15A is preferably about 0.4 μm or more and about 5 μm or less, for example. Furthermore, as shown in FIG. 3B, magnesium is also segregated and layered on the surface close to the main surface, of the internal nickel electrode layer 15 close to the main surface provided closest to the main surface in the lamination direction T. Furthermore, in a region within about 10 μm from the end in the width direction of the internal nickel electrode layer 15, magnesium is segregated on the surface close to the column member 153 at the portion where the column member 153 described above penetrates.

Two-Layer Structure of the Side Gap Portion 30

The side gap portions 30 each include a plurality of layers. When the inner layer thereof is defined as an inner layer 30in and the outer layer thereof is defined as the outer layer 30ou, the thickness is expressed as the inner layer 30in<the outer layer 30ou. However, the present invention is not limited thereto, and the side gap portion 30 may include a single layer. With a two-layer structure, since an interface is provided between the outer layer 30ou and the inner layer 30in, it is possible to alleviate the stress acting on the multilayer ceramic capacitor 1 by this interface.

The particle size of the dielectric particles included in the side gap portion 30 is reduced toward the outer layer 30ou from the inner layer 30in. The particle size of the particles is, for example, about 400 nm or more and about 450 nm or less at the outermost side, and preferably about 600 nm or more at the innermost side, and the particle size of the innermost particles is preferably about 1.5 times or more than the particle size of the outermost particles. It should be noted that the particle size of the particles is calculated by dividing the cross section TW of the middle of the length direction L shown in FIGS. 3A and 3B into a plurality of regions by about 20 nm in the width direction from a side surface, measuring an area of each dielectric particle in each region, converting the resulting area to a diameter of a circle having the same area, and averaging the resulting diameters for each region. It should be noted that, regarding the region which is located at the innermost side and less than about 20 nm in the width direction, the average size within the region is defined as an average size.

Furthermore, it is preferable to increase the content of silicon oxide of the outer layer 30ou to greater than that of the inner layer 30in. Thus, it is possible to improve the strength of the side gap portions 30, and thus, the flexural strength of the multilayer ceramic capacitor 1 is improved. Furthermore, cracks or chipping hardly occurs in the side gap portions 30, and it is possible to prevent the intrusion of moisture. Therefore, it is possible to ensure the insulating property of the multilayer ceramic capacitor 1. As a result, it is possible to provide the multilayer ceramic capacitor 1 with improved reliability. It should be noted that silicon may be segregated within the outer layer 30ou.

External Nickel Layer 4

As shown in FIGS. 5 and 2, the external nickel layer 4 includes a first external nickel layer 4a provided close to a first end surface Ca of the multilayer body 2, and a second external nickel layer 4b provided on a second end surface Cb of the multilayer body 2. When it is not necessary to distinguish the first external nickel layer 4a and the second external nickel layer 4b, they are collectively described as the external nickel layer 4.

Material of the External Nickel Layer 4

Furthermore, the external nickel layer 4 includes a dielectric which is glass as a material included in nickel as well. In the external nickel layer 4 in the cross section LT of the central portion in the width direction W shown in FIG. 2, the dielectric is included, for example, in about 30% to about 40% in area ratio. Thus, by including the material common thereto, it is possible to increase the bonding strength when the external nickel layer 4 and the dielectric layer 14 are sintered simultaneously (i.e., cofired).

Size of the External Nickel Layer 4

As shown in FIG. 5, the external nickel layer 4 is smaller than the end surface C of the multilayer body 2, and is provided on the end surface of the multilayer body 2, at a region other than the region where the corner portion R1 and the rounded ridge portion R2 are provided.

Aspect Ratio of the External Nickel Layer 4

As shown in FIG. 5, when the dimension in the lamination direction T of the external nickel layer 4 is defined as TN, and the dimension in the width direction W of the external nickel layer 4 is defined as WN, it is preferable for WN<TN, that is, the external nickel layer 4 to have a vertically long shape. However, the present invention is not limited thereto, and the external nickel layer 4 may have a horizontally long shape.

Relationship Between the External Nickel Layer 4 and the Inner Layer Portion 11

As shown in FIG. 5, when the dimension in the lamination direction T of the external nickel layer 4 is defined as TN, and the dimension in the lamination direction T of the inner layer portion 11 (effective layer) is defined as T1, then T1<TN.

When copper of the external copper electrode layer 3 is diffused into the interior of the internal nickel electrode layer 15, the thickness of the internal nickel electrode layer 15 increases, and cracks may occur. More specifically, cracks are likely to occur when copper diffuses into the internal nickel electrode layer 15 closest to the main surface A. However, due to T1<TN in the present preferred embodiment, the region other than both side portions in the internal nickel electrode layer 15 closest to the main surface A side is reliably covered with the external nickel layer 4. Therefore, the diffusion of copper to the central portion of the internal nickel electrode layer 15 close to the main surface A is prevented, and thus, the possibility of the occurrence of cracks is reduced or prevented.

Furthermore, when the dimension in the width direction W of the external nickel layer 4 is defined as WN, and the dimension in the width direction W of the inner layer portion 11, i.e., the dimension in the width direction W of the internal nickel electrode layer 15 is defined as W1, then WN<W1.

As a result, the internal nickel electrode layer 15 includes at least one uncovered region 41 which is not covered with the external nickel layer 4 in the width direction W. The uncovered regions 41 are provided on both sides in the width direction W of the external nickel layer 4, and the length on one side is preferably about 1 μm or more and about 50 μm or less, and more preferably about 5 μm or less, for example.

As shown in FIG. 4B, in the uncovered regions 41, the internal nickel electrode layer 15 is directly bonded to the external copper electrode layer 3, and copper shown by the black triangles in the drawing of the external copper electrode layer 3 is diffused into the internal nickel electrode layer 15, such that an interdiffusion region reacted with nickel is provided. This interdiffusion region ensures a strong bond between the external copper electrode layer 3 and the internal nickel electrode layer 15. In analysis of the diffusion state within such an internal nickel electrode layer 15, it is possible to observe the cross section LW shown in FIGS. 4A and 4B by performing the wavelength dispersive X-ray (WDX) analysis. It should be noted that the copper of the external copper electrode layer 3 is also diffused into a portion covered with the external nickel layer 4 in the internal nickel electrode layer 15. Furthermore, in the uncovered regions 41, since magnesium is segregated in the vicinity of the end of the internal nickel electrode layer 15 in the width direction W, a reaction layer of magnesium-copper-nickel (nickel is indicated by the black squares in the drawing) is also formed.

Thus, when T1<TN and WN<W1 are satisfied in the relationship between the external nickel layer 4 and the inner layer portion 11, strong bonding between the copper of the external copper electrode layer 3 and the nickel of the internal nickel electrode layer 15 is ensured while cracks are prevented.

Relationship Between the External Nickel Layer 4 and the Multilayer Body 2

As shown in FIG. 5, when the dimension in the lamination direction T of the external nickel layer 4 is defined as TN, and the dimension in the lamination direction T of the multilayer body 2 is defined as T0, then TN<T0.

When the dimension in the width direction W of the external nickel layer 4 is defined as WN, and the dimension in the width direction W of the multilayer body 2 is defined as W0, then WN<W0.

In other words, as shown in FIG. 5, T1<TN<T0 and WN<W1<W0 are satisfied.

When these relationships are satisfied, cracks are less likely to occur. Furthermore, when these relationships are satisfied, it becomes easier to obtain stronger bonding between the external copper electrode layer 3 and the internal nickel electrode layer 15.

Thickness of the External Nickel Layer 4

Next, the thickness of the external nickel layer 4 will be described. As shown in FIG. 2, in the cross section LT passing through the middle in the width direction W of the multilayer ceramic capacitor 1, and extending in the length direction L and the lamination direction T, the external nickel layer 4 is equally or substantially equally divided into four portions in the lamination direction T by three linear lines D41, D42, and D43 extending in the length direction L. The average value of the thicknesses of the first external nickel layer 4a and the second external nickel layer 4b on the center linear line D42 among the three linear lines D41, D42, and D43 is defined as Tem. The average value of the thicknesses of the first external nickel layer 4a and the second external nickel layer 4b on all of the three linear lines D41, D42, and D43 is defined as Tea.

At this time, for example, about 0.8 μm≤Tea≤about 15 μm, and about 2 μm≤Tem≤about 15 μm are established. Furthermore, it is preferable for about 0.8 μm≤Tea≤about 7 μm, and about 2 μm≤Tem≤about 7 μm, for example. Furthermore, for example, the range of Tea/Tem in the present preferred embodiment is as follows: about 0.2≤Tea/Tem≤about 1.1, preferably, about 0.33 Tea/Tem about 1.1, more preferably, Tea/Tem=about 1.

In other words, it is most preferable that Tea/Tem be about 1, that is, the thickness of the external nickel layer 4 is uniform or substantially uniform. However, as long as about 0.2≤Tea/Tem≤about 1.1 is satisfied, the compressive stresses of the external nickel layer 4 can be averaged, and thus, cracks can be prevented. It should be noted that both Tem and Tea are more preferably about 5 μm to 7 about μm, for example, and, as the thickness becomes thinner, the internal electrode can be made larger, and thus, the capacitance can be made larger.

It should be noted that Tea, which is the average thickness of the external nickel layer 4, can be measured by the following procedures. The multilayer body 2 is polished until the central portion in the width direction W to expose the cross section LT. Thereafter, the external nickel layer 4 in the cross section LT is identified with an optical microscope, or the external nickel layer 4 including a nickel component is identified by the WDX (wavelength dispersive X-ray analysis method) or the like. Thereafter, as described above, Tem and Tes are obtained, and (Tem+2Tes)/3=Tea is calculated.

Thus, since the external nickel layer 4 is provided, copper used as the external copper electrode layer 3 is prevented from excessively diffusing into the interior of the internal nickel electrode layer 15. Unless the external nickel layer 4 is provided, since the area where the external copper electrode layer 3 and the internal nickel electrode layer 15 are in direct contact with each other is large, copper of the external copper electrode layer 3 is excessively diffused into the interior of the internal nickel electrode layer 15. Thus, cracks may occur due to the thickness of the internal nickel electrode layer 15 being increased by diffusion. However, according to the present preferred embodiment, the occurrence of such a crack is prevented.

Fluorine Layer 40

A fluorine layer 40 is provided on the surface of the multilayer body 2 on which the external nickel layer 4 is provided as shown in FIG. 5.

External Copper Electrode Layer 3

The external copper electrode layers 3, which are external electrode layers, include a first external copper electrode layer 3a provided outside the first external nickel layer 4a close to the first end surface Ca of the multilayer body 2, and a second external copper electrode layer 3b provided outside the second external nickel layer 4b close to the second end surface Cb of the multilayer body 2. When it is not necessary to distinguish the first external copper electrode layer 3a and the second external copper electrode layer 3b from each other, they are collectively described as the external copper electrode layer 3. The external copper electrode layer 3 covers not only the end surface C but also portions close to the end surface C of the main surface A and the side surface B.

Material of the External Copper Electrode Layer 3

The external copper electrode layer 3 is provided by coating and firing a conductive paste including copper and glass. The external copper electrode layer 3 is post-fire to be separately sintered after the multilayer body 2 is sintered. Since the external copper electrode layer 3 includes glass, at least one of a nickel-based oxide and/or a silicon-based oxide is formed as a composite between the external copper electrode layer 3 and the external nickel layer 4. The nickel-based oxide and/or silicon-based oxide are observed by TEM (Transmission Electron Microscopy). Thus, since the nickel-based oxide such as NiO and/or the silicon-based oxide such as SiO, for example, are provided between the external nickel layer 4 and the external copper electrode layer 3, moisture resistance is improved while adhesiveness is improved. The nickel-based oxide is acceptable as long as it includes nickel, and whether or not nickel is included can be determined by composition analysis such as WDX/TEM. Similarly to the nickel-based oxide, the silicon-based oxide is acceptable as long as it includes silicon, and whether or not silicon is included can be determined by composition analysis such as WDX/TEM.

The end of the first lead-out portion 151a of the first internal nickel electrode layer 15a is exposed at the first end surface Ca, is electrically connected to the first external copper electrode layer 3a via the first external nickel layer 4a, and is directly electrically connected to the first external copper electrode layer 3a in a region on both sides in the width direction W outside the first external nickel layer 4a. The end of the second lead-out portion 151b of the second internal nickel electrode layer 15b is exposed at the second end surface Cb, is electrically connected to the second external copper electrode layer 3b via the second external nickel layer 4b, and is directly electrically connected to the second external copper electrode layer 3b in a region on both sides in the width direction W outside the second external nickel layer 4b. Thus, a structure in which a plurality of capacitor elements are electrically connected in parallel is established between the first external copper electrode layer 3a and the second external copper electrode layer 3b.

As described above, not all of the internal nickel electrode layer 15 exposed to the outside of the multilayer body 2 is covered with the external nickel layer 4. Both ends in the width direction W of the internal nickel electrode layer 15 are not covered with the external nickel layer 4. Both of these ends are in direct contact with the internal nickel electrode layer 15, and the interdiffusion region between copper and nickel exists between the external copper electrode layer 3 and both ends of the internal nickel electrode layer 15. Therefore, since the external copper electrode layer 3 and the internal nickel electrode layer are directly bonded with each other in this interdiffusion region, strong bonding is ensured.

Plated Layer

Furthermore, as shown in FIGS. 2 and 4, a nickel plated layer 31 and a tin plated layer 32 are further provided outside the external copper electrode layer 3.

Method of Manufacturing a Multilayer Ceramic Capacitor 1

FIG. 7 is a flowchart for explaining a method of manufacturing the multilayer ceramic capacitor 1. The method of manufacturing the multilayer ceramic capacitor 1 includes a multilayer body preparing step S1 of preparing the multilayer body 2. The multilayer body preparing step S1 further includes a material sheet preparing step S11, a material sheet laminating step S12, a mother block forming step S13, a mother block cutting step S14, and a side gap portion forming step S15. FIGS. 8A to 8F are diagrams for explaining the multilayer body preparing step S1.

Material Sheet Preparing Step S11

In the material sheet preparing step S11, first, a ceramic powder including, for example, barium, titanium and dysprosium, and a ceramic slurry including a binder and a solvent are prepared. The ceramic slurry is molded into a sheet shape using, for example, a die coater, gravure coater, a microgravure coater, or the like on a carrier film, whereby a multilayer ceramic green sheet 101 is produced. Furthermore, an upper outer layer portion ceramic green sheet 112 defining and functioning as the upper outer layer portion 12a and a lower outer layer portion ceramic green sheet 113 defining and functioning as the lower outer layer portion 12b are also manufactured in the same or similar manner.

Subsequently, the conductive paste 102 including nickel as a main component and also including a glass (silicon oxide) component is printed to form a strip-shaped pattern by, for example, screen printing, ink jet printing, gravure printing, or the like on the multilayer ceramic green sheet 101.

Thus, as shown in FIG. 8A, a material sheet 103 is prepared in which the conductive paste 102 defining and functioning as the internal nickel electrode layer 15 is printed on the surface of the multilayer ceramic green sheet 101 defining and functioning as the dielectric layer 14.

Material Sheet Laminating Step S12

Next, as shown in FIG. 8B, a plurality of material sheets 103 are laminated in a material sheet laminating step S12. More specifically, the plurality of material sheets 103 are laminated such that strip-shaped conductive pastes 102 extend in the same direction and are shifted by half pitch in the width direction between the adjacent material sheets 103. Furthermore, the upper outer layer portion ceramic green sheet 112 defining and functioning as the upper outer layer portion 12a is laminated on one side of the plurality of laminated material sheets 103, and the lower outer layer portion ceramic green sheet 113 defining and functioning as the lower outer layer portion 12b is laminated on the other side thereof.

Mother Block Forming Step S13

Subsequently, in a mother block forming step S13, the upper outer layer portion ceramic green sheet 112, the plurality of laminated material sheets 103, and the lower outer layer portion ceramic green sheet 113 are subjected to thermocompression bonding. As a result, the mother block 110 shown in FIG. 8C is formed.

Mother Block Cutting Step S14

Then, in a mother block cutting step S14, the mother block 110 is cut along a cutting line X and a cutting line Y intersecting the cutting line X corresponding to the dimension of the multilayer main body 10 as shown in FIG. 8C. As a result, the multilayer main body 10 shown in FIG. 8D is manufactured. It should be noted that the cutting line Y is orthogonal or substantially orthogonal to the cutting line X in the preferred embodiment. At this time, the internal nickel electrode layer 15 is exposed at the side portion of the multilayer main body 10.

Side Gap Portion Forming Step S15

Next, in a side gap portion forming step S15, a ceramic slurry is produced in which, for example, magnesium serving as a sintering aid is added to the dielectric powder including barium, titanium, and dysprosium, similarly to the multilayer ceramic green sheet 101, and further including silicon oxide and phosphorus. Then, the ceramic slurry is coated on a resin film, and dried to produce a side gap portion ceramic green sheet 114. The side gap portion ceramic green sheet 114 is manufactured for an inner layer 30*in* and for an outer layer 30*ou*.

Then, as shown in FIG. 8E, the side surface LT where the internal nickel electrode layer 15 of the multilayer main body 10 is exposed is first pressed against the side gap portion ceramic green sheet 114 for the inner layer 30*in*. Thus, the side gap portion ceramic green sheet 114 is crimped against the side surface LT of the multilayer main body 10, and the shearing force acts on the end of the side surface LT of the multilayer main body 10, such that the side gap portion ceramic green sheet 114 is punched. In this manner, one surface of the side surface LT of the multilayer main body 10 is covered with the side gap portion ceramic green sheet 114. Next, the other surface of the side surface LT of the multilayer main body 10 is also covered with the side gap portion ceramic green sheet 114 for the inner layer 30*in* in the same or similar manner.

Furthermore, the side gap portion ceramic green sheet 114 for the outer layer 30*ou* also covers both outer surfaces of the side gap portion ceramic green sheet 114 for the inner layer 30*in* on the side surface LT of the multilayer main body 10 in the same manner. Thus, as shown in FIG. 8F, the multilayer body 2 in a state before sintering is formed in which the side gap portion 30 of the two layers of the inner layer 30*in* and the outer layer 30*ou* is adhered to the side surface LT of the multilayer main body 10.

Nickel Sheet Attaching Step S2

FIGS. 9A to 9L are diagrams for explaining steps after a nickel sheet attaching step S2 in the method of manufacturing the multilayer ceramic capacitor 1. In the nickel sheet attaching step S2, as shown in FIG. 9A, a nickel sheet 115 defining and functioning as the external nickel layer 4 is pressed against the end surface C of the multilayer body 2 in a state before sintering, similarly to the attachment of the side gap portion ceramic green sheet 114. It should be noted that the material of the nickel sheet 115 also includes glass as a dielectric. Thus, the nickel sheet 115 is crimped to the end surface C of the multilayer body 2, and the shearing force acts on the end of the end surface C of the multilayer body 2, such that the nickel sheet 115 is punched. In this way, one surface of the end surface C of the multilayer body 2 is covered by the nickel sheet 115. Next, the other surface of the end surface C of the multilayer body 2 is similarly covered with the nickel sheet 115. It should be noted that, at this time, as shown in FIG. 9B, a portion of the main surface A and a portion of the side surface B as well as the end surface C of the multilayer body 2 are also covered by the nickel sheet 115.

It should be noted that the multilayer body 2 may be immersed in a nickel paste tank filled with a paste in which glass is added to nickel, thus coating the nickel paste on the multilayer body 2. In this case, in order to make the thickness of the end surface of the external nickel layer 4 uniform or substantially uniform, the nickel paste is coated, following which the end surface thereof is pressed against a surface plate or the like to remove an excess paste.

Barrel Step S3

Next, in a barrel step S3, the multilayer body 2 with the end surface C covered by the nickel sheet 115 shown in FIG. 9A is subjected to barrel polishing. As a result, as shown in FIG. 9C and FIG. 5, the corner portion R1 and the ridge portion R2 of the multilayer body 2 are rounded. Furthermore, the nickel sheet 115 covering the main surface A and the side surface B of the multilayer body 2 is also removed, and thus, the nickel sheet 115 remains only in a smaller area than the outer periphery of the end surface C.

Fluorine Layer Forming Step S4

Then, in a fluorine layer forming step S4, a fluorine layer 40 is formed on the surface of the multilayer body 2 including the external nickel layer 4 as shown by reference numeral in FIG. 9E.

External Nickel Layer Forming Step S5

In an external nickel layer forming step S5, the multilayer body 2 before sintering to which the nickel sheet 115 is attached is subjected to degreasing treatment under a predetermined condition, and then fired at a predetermined temperature in a mixed atmosphere of nitrogen-hydrogen-steam. As a result, as shown in FIG. 9E, the nickel sheet 115 is fired to form the external nickel layer 4. At this time, in the barrel step S3, the nickel sheet 115 that covers the main surface A and the side surface B of the multilayer body 2 is removed and, since the nickel sheet 115 remains only in a smaller area than the outer periphery of the end surface C, the compressive stress generated during firing is reduced.

Here, magnesium of the side gap portion 30 migrates during sintering toward the internal nickel electrode layer 15. Thus, after sintering, magnesium of the side gap portion 30 is segregated on the side of the internal nickel electrode layer 15. It should be noted that the dielectric layer 14 and the side gap portion 30 are manufactured with substantially the same material; however, since the side gap portion 30 is attached to the multilayer main body 10 including the dielectric layer 14, there is an interface between the side gap portion 30 and the multilayer main body 10 even after sintering.

Copper Film Forming Step S6

A copper film forming step S6 includes a first copper film forming step S61, a first removing step S62, a second copper film forming step S63, and a second removing step S64.

First Copper Film Forming Step S61

In the first copper film forming step S61, as shown in FIG. 9F, the end surface C on which the external nickel layer 4 is provided is immersed in a copper paste 116 including glass.

At this time, since the fluorine layer 40 is formed on the surface of the multilayer body 2 to improve the water repellency, the copper paste 116 is prevented from wetting the surface of the multilayer body 2 excessively and becoming a curved crescent shape. Therefore, as shown in FIG. 9G, since a boundary 116*a* of the copper paste becomes flat on the main surface A and the side surface B of the multilayer body 2, it is possible to control the amount of the copper paste 116 to be wrapped around the main surface A and the side surface B side, and thus, it is possible to control the size of the external copper electrode layer 3.

First Removing Step S62

As shown in FIG. 9G, in a first removing step S62, in order to make the thickness of the end surface of the copper paste 116 uniform or substantially uniform, the end surface is pressed against the surface plate 118 or the like after the application of the copper paste 116, and the excessive copper paste 116 is removed. After the copper paste 116 on the one end surface C is dried, the copper paste 116 is coated to the other end surface C in the same manner.

Second Copper Film Forming Step S63

As shown in FIG. 9H, in the second copper film forming step S63, the end surface C on which the external nickel layer 4 is formed is immersed in a copper paste 117 including glass, as shown in FIG. 9F. The copper paste 117 has a larger content of glass than the copper paste 116 in the first copper film forming step S61.

Second Removing Step S64

As shown in FIG. 9I, in a second removing step S64, in order to make the thickness of the end surface of the external copper electrode layer 3 uniform or substantially uniform, the end surface thereof is pressed against the surface plate 118 or the like after the application of the copper paste 117, and the excessive copper paste 117 is removed, similarly to the first removing step S62. After the copper paste 117 on the one end surface C is dried, the copper paste 117 is also coated on the other end surface C in the same manner.

External Copper Electrode Layer Forming Step S7

In an external copper electrode layer forming step S7, as shown in FIG. 9J, after the copper paste 116 is dried, firing is performed for a predetermined time under conditions of the nitrogen-atmosphere in which the oxygen partial pressure PO2 is about $10^{-9} \leq PO2 \leq$ about $10^{-13}$ Pa, and the firing temperature TY is about 700° C. $\leq$ TY $\leq$ about 950° C., to form the external copper electrode layer 3.

In the external copper electrode layer forming step S7, a reaction layer is formed between the external copper electrode layer 3 and the external nickel layer 4. This reaction layer includes a nickel-based oxide and/or a silicon-based oxide as a composite including a glass component included in the external copper electrode layer 3, that is, a reaction layer including at least one of a nickel-based oxide or a silicon-based oxide.

By providing the external nickel layer 4, the excessive intrusion of copper of the external copper electrode layer 3 into the internal nickel electrode layer 15 is prevented, and cracks generated in the internal nickel electrode layer 15 are prevented.

Furthermore, there is a portion where the external copper electrode layer 3 is in direct contact with the internal nickel electrode layer 15, and thus, a strong bonding between the external copper electrode layer 3 and the internal nickel electrode layer 15 is ensured.

Since the external copper electrode layer 3 includes glass, the moisture resistance is ensured by the glass, and in the subsequent plating step, the adhesiveness and the fixing force of the plating are imparted.

Nickel Plating Step S8

As shown in FIG. 9K, in a nickel plating step S8, the nickel plated layer 31 is formed on the outer periphery of the external copper electrode layer 3. At this time, since the external copper electrode layer 3 is provided, water is prevented from entering the interior of the multilayer body 2 even in a case of the immersion in a plating solution.

Tin Plating Step S9

Next, as shown in FIG. 9L, a tin plated layer 32 is formed on the outer periphery of the external copper electrode layer 3.

Through the above steps, the multilayer ceramic capacitor 1 of the present preferred embodiment is manufactured. Although the preferred embodiments of the present invention have been described above, the present invention is not limited to these preferred embodiments, and various modifications are made within the scope of the gist thereof.

Second Preferred Embodiment

Figure 10:
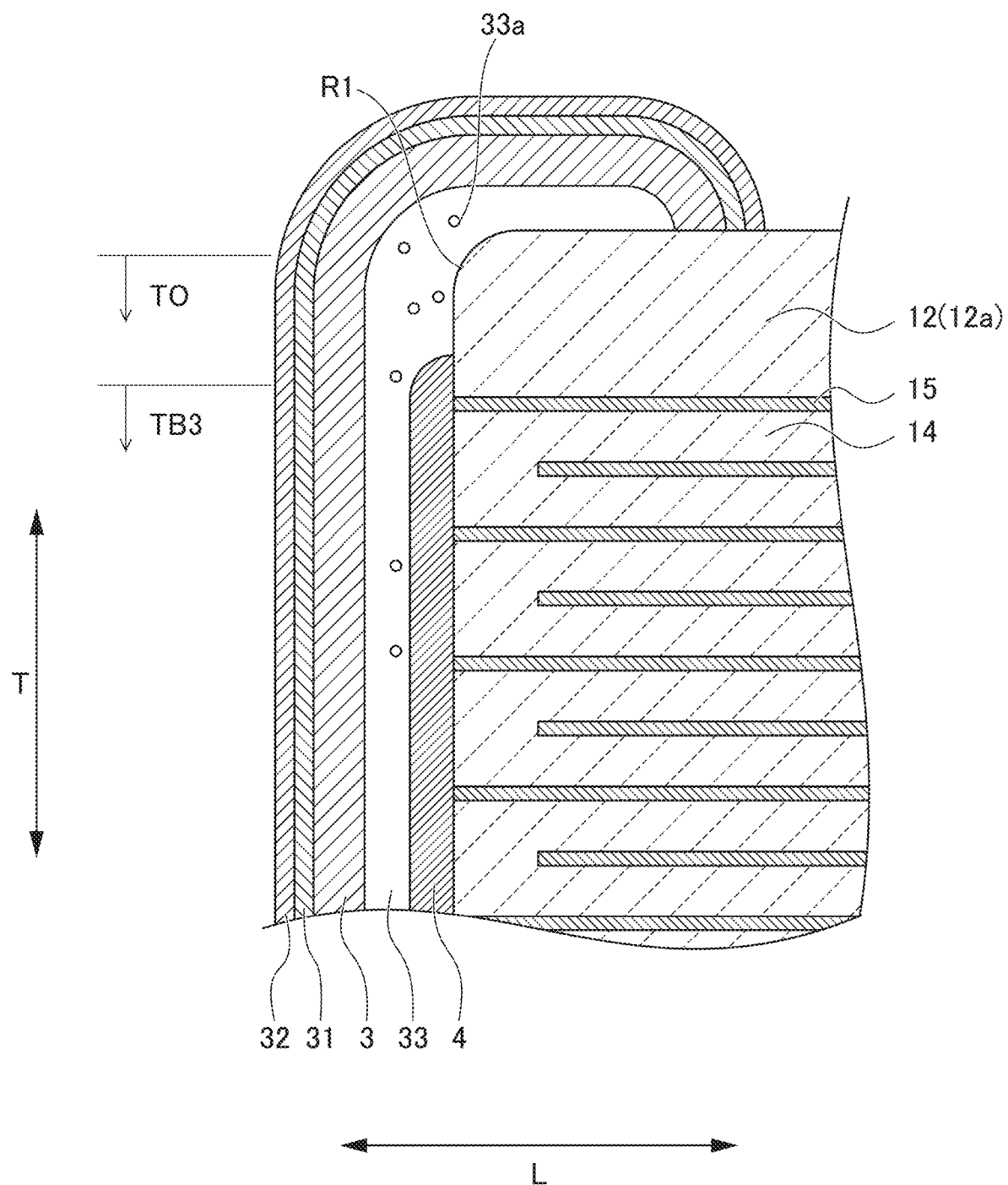
FIG. 10 is a partially enlarged view of a cross-section LT of a multilayer ceramic capacitor according to a second preferred embodiment of the present invention.
Figure 11:
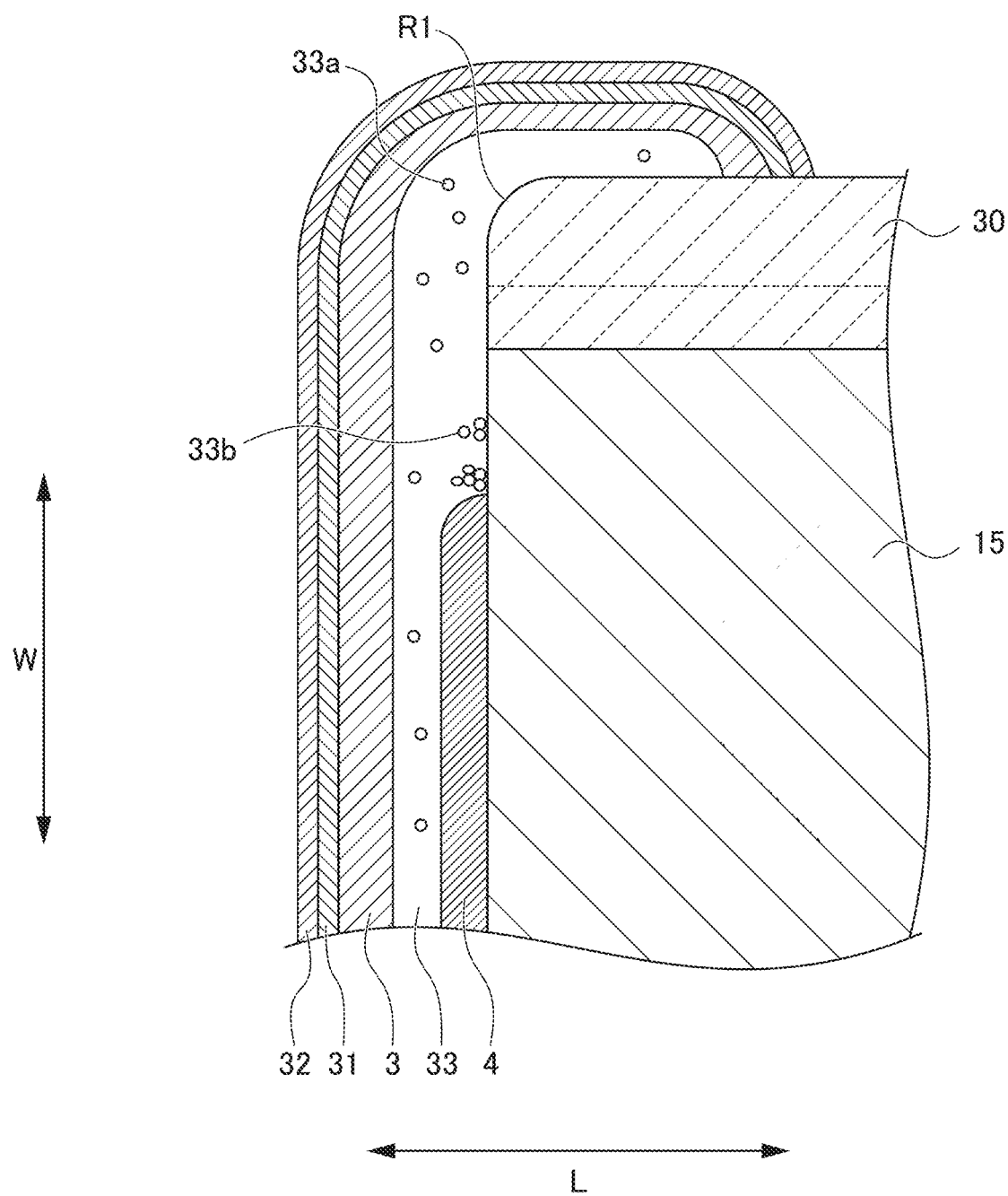
FIG. 11 is a partially enlarged view of a cross-section LW of the multilayer ceramic capacitor of the second preferred embodiment of the present invention.

Next, a second preferred embodiment of the present invention will be described. FIG. 10 is a partially enlarged view of the cross section LT of a multilayer ceramic capacitor 1 according to a second preferred embodiment of the present invention. FIG. 11 is a partially enlarged view of the cross section LW of the multilayer ceramic capacitor 1 of the second preferred embodiment. In the following description, the same or corresponding portions as those of the first preferred embodiment are denoted by the same reference numerals, and descriptions thereof are omitted.

The second preferred embodiment differs from the first preferred embodiment in that a conductive thermosetting resin layer 33 is provided between the external nickel layer 4 and the external copper electrode layer 3. As a material of the thermosetting resin layer 33, for example, a thermosetting resin such as an epoxy resin is used, and metal fillers 33a are included in the thermosetting resin layer 33. The metal fillers 33a are, for example, each made of copper, and in the case of copper, migration is prevented. The copper metal filler 33a may be coated with tin, and since tin is diffusion bonded to the external nickel layer 4, it is possible to reduce or prevent the metal resistance, a result of which it is possible to reduce the RDC (DC resistance). The metal filler 33a may be silver, for example. RDC can be prevented or further reduced by using silver. As shown in FIG. 11, the metal filler 33a and the nickel of the internal nickel electrode layer 15 react with each other, such that the metal filler 33a collects in the vicinity of the nickel of the internal nickel electrode layer 15, and protrusions 33b are formed.

Third Preferred Embodiment

Figure 12:
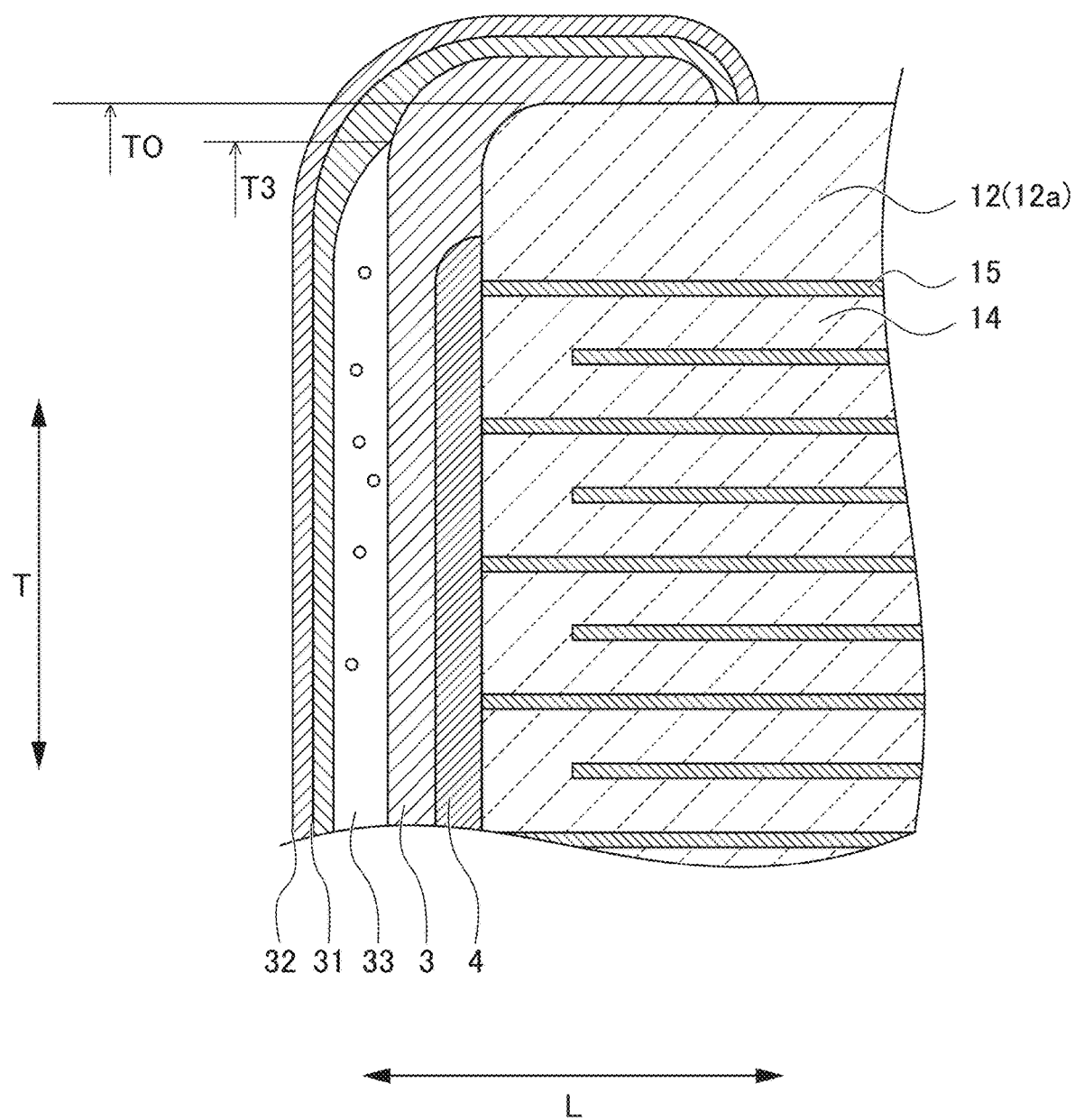
FIG. 12 is a partially enlarged view of a cross-section LT of a multilayer ceramic capacitor according to a third preferred embodiment of the present invention.
Figure 13:
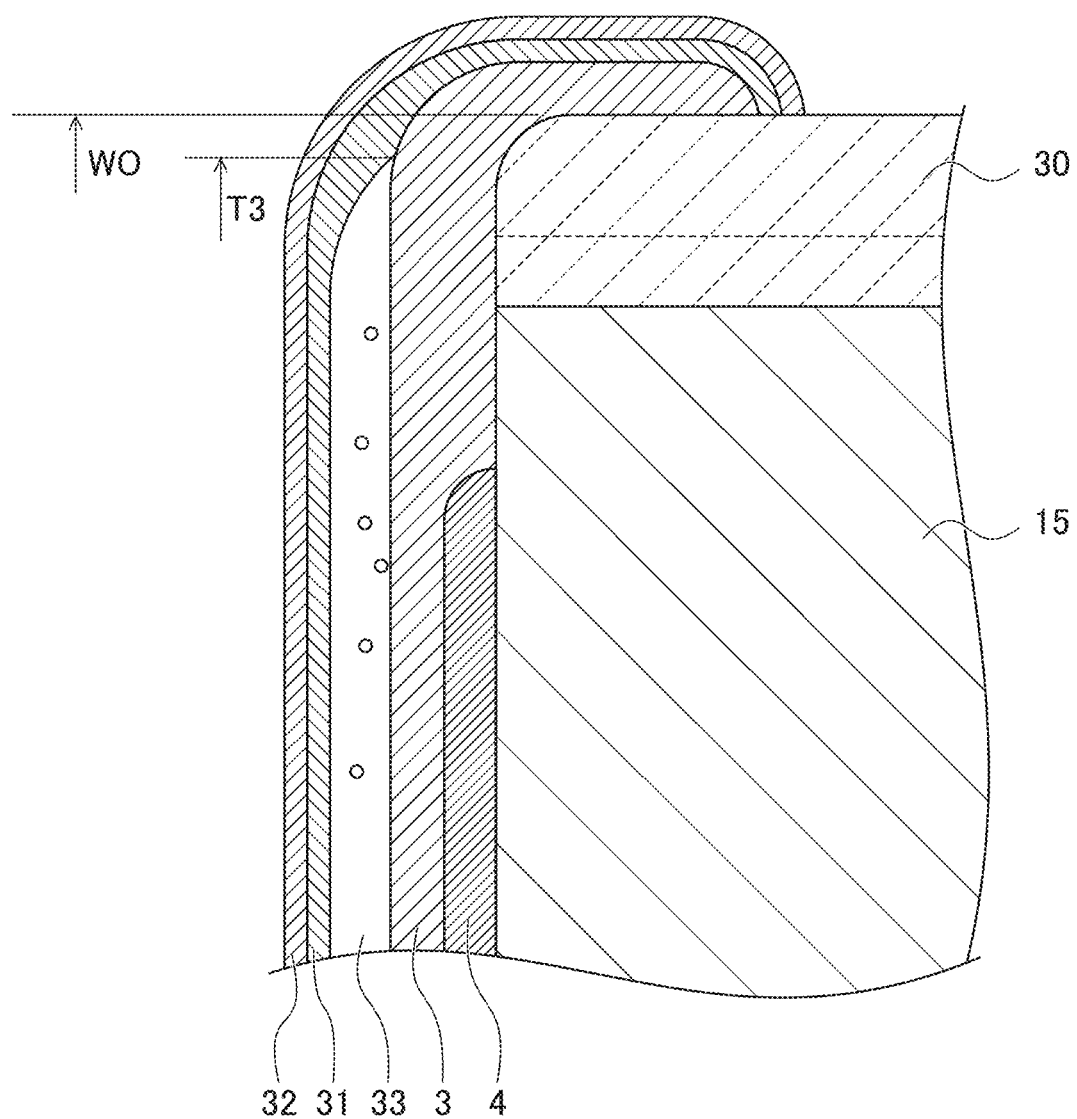
FIG. 13 is a partially enlarged view of a cross-section LW of the multilayer ceramic capacitor of the third preferred embodiment of the present invention.

FIG. 12 is a partially enlarged view of a cross section LT of a multilayer ceramic capacitor according to a third preferred embodiment of the present invention. FIG. 13 is a partially enlarged view of a cross section LW of the multilayer ceramic capacitor of the third preferred embodiment. The third preferred embodiment differs from the second preferred embodiment in that the conductive thermosetting resin layer 33 is provided outside the external copper electrode layer 3. In the third preferred embodiment, the thermosetting resin layer 33 does not cover the entire surface of the external copper electrode layer 3, and thus, does not cover the corner portions of the external copper electrode layer 3. That is, when the dimension in the lamination direction T of the thermosetting resin layer 33 is defined as T3, and the dimension in the lamination direction T of the multilayer body is defined as T0, then T3<T0.

Furthermore, when the dimension of the thermosetting resin layer 33 in the width direction is defined as W3, and the dimension of the multilayer body 2 in the width direction is defined as W0, then W3<W0.

As described above, according to the second preferred embodiment and the third preferred embodiment, the thermosetting resin layer 33 is provided. Since the thermosetting resin layer 33 includes a thermosetting resin, the thermosetting resin layer is more flexible than, for example, the plating layer, the external copper electrode layer 3, or the external nickel layer 4. Therefore, even when an impact caused by physical shock or thermal cycle is applied to the multilayer ceramic capacitor 1, the thermosetting resin layer 33 defines and functions as a buffer layer, and thus, cracks in the multilayer ceramic capacitor 1 are reduced or prevented from occurring. In addition, since the thermosetting resin layer 33 absorbs moisture, the moisture resistance reliability of the multilayer ceramic capacitor 1 can be improved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   a multilayer body including a multilayer main body and side gap portions, wherein the multilayer main body includes an inner layer portion including dielectric layers and internal nickel electrode layers laminated alternately therein, and including end surfaces provided on both sides in a length direction intersecting a lamination direction, the internal nickel electrode layers being exposed at the end surfaces, and the side gap portions being provided on both sides of the multilayer main body in a width direction intersecting the lamination direction and the length direction;
   external nickel layers on the end surfaces of the multilayer main body; and
   external copper electrode layers covering the end surfaces on which the external nickel layers are provided; wherein
   at least one of a nickel-based oxide or a silicon-based oxide is provided between the external nickel layer and the external copper electrode layer;
   a nickel layer and a tin layer are provided outside the external copper electrode layer; and
   in a cross section passing through a middle of the electronic component in the width direction and extending in the length direction and the lamination direction, when the external nickel layer is divided into four equal portions in the lamination direction by three linear lines extending in the length direction, an average value of a thickness of the external nickel layer on a center linear line among the three linear lines is defined as $Tem$, and an average value of a thickness of the external nickel layer on all of the three linear lines is defined as $Tea$, and a relationship of about $0.2 \leq Tea/Tem \leq about\ 1.1$ is satisfied.

2. The electronic component according to claim 1, wherein a relationship of about $0.33 \leq Tea/Tem \leq about\ 1.1$ is satisfied.

3. The electronic component according to claim 1, wherein a relationship of about $0.8\ \mu m \leq Tea \leq about\ 15\ \mu m$, and a relationship of about $2\ \mu m \leq Tem \leq about\ 7\ \mu m$ are satisfied.

4. The electronic component according to claim 1, wherein the dielectric layers each have a thickness $tu$ of about $0.40\ \mu m \leq tu \leq about\ 0.50\ \mu m$.

5. The electronic component according to claim 1, wherein the internal nickel electrode layers each have a thickness $tn$ of about $0.25\ \mu m \leq tn \leq about\ 0.33\ \mu m$.

6. The electronic component according to claim 1, wherein the side gap portions each have a thickness $ts$ of about $5\ \mu m \leq ts \leq about\ 12\ \mu m$.

7. The electronic component according to claim 1, further comprising:
   outer layer portions provided on both sides of the inner layer portion in the lamination direction; wherein
   the outer layer portions include a lower outer layer portion provided on a first side on which a substrate is mounted, and an upper outer layer portion provided on a second side opposite to the first side, in the lamination direction of the inner layer portion; and
   the upper outer layer portion has a thickness $tg1$ of about $10\ \mu m \leq tg1 \leq about\ 20\ \mu m$.

8. The electronic component according to claim 1, wherein the electronic component comprises a multilayer ceramic capacitor.

* * * * *